Sept. 16, 1969   C. T. SLOAN   3,467,404
CENTRIFUGAL CHUCK
Filed Nov. 14, 1966
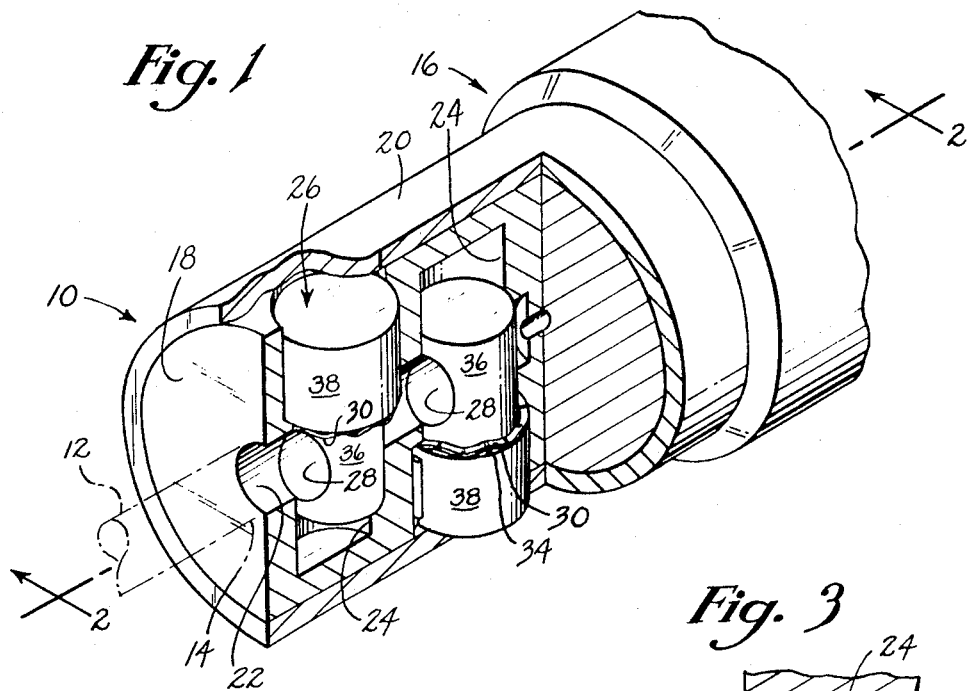
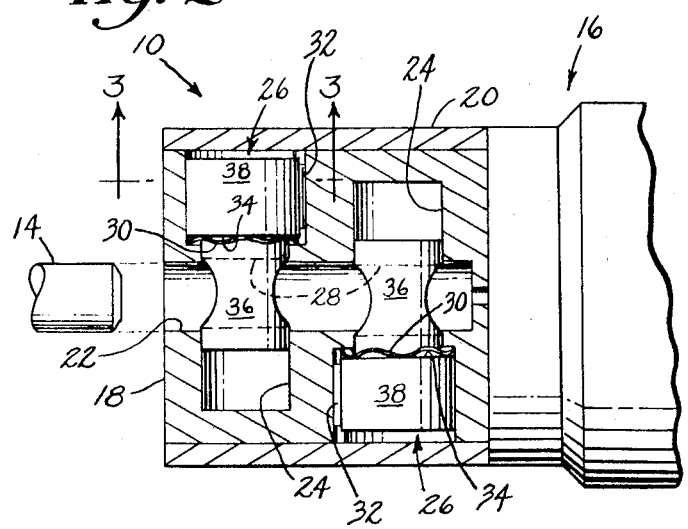
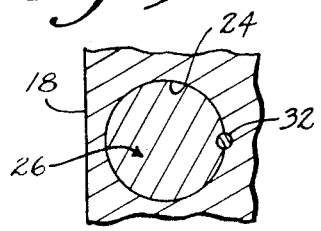
INVENTOR
Charles T. Sloan
BY
McCormick, Paulding & Huber
ATTORNEYS text continues …

United States Patent Office 3,467,404
Patented Sept. 16, 1969

3,467,404
CENTRIFUGAL CHUCK
Charles T. Sloan, Bloomfield, Conn., assignor to The Whitnon Manufacturing Company, Farmington, Conn., a corporation of Connecticut
Filed Nov. 14, 1966, Ser. No. 593,843
Int. Cl. B23b *31/16, 5/22, 5/34*
U.S. Cl. 279—66                                                    7 Claims

ABSTRACT OF THE DISCLOSURE

A spindle has axially spaced diametrically opposed cavities communicating with an axially extending tool receiving bore and weighted plugs are slidably received for limited radial movement in these cavities. Each plug has an opening which is alignable with the spindle bore to receive the shank portion of a tool. Springs urge the plugs slightly out of alignment to hold the tool in place when the spindle is not rotating, and the weight distribution of the plugs is such that centrifugal force complements this spring force to firmly anchor the tool for rotation with the spindle.

---

This invention relates to chucks for releasably holding a tool element or the like, and deals more particularly with a rotatable chuck which includes centrifugally operated parts for gripping the shank portion of such a tool element.

An object of the present invention is to provide a centrifugal chuck which is characterized by a minimum number of parts, but which is nevertheless very reliable in operation, as well as being well adapted to high quantity low cost production.

A more specific object of the present invention is to provide a centrifugal chuck in which the tool is held with a force which increases in proportion of the rotational speed to which it is subjected.

Another specific object is to provide a chuck in which a tool element can be releasably retained for quick removal without any wrench or the like, the tool element being frictionally retained in the chuck even when it is not rotating.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a perspective view of a centrifugal chuck constructed in accordance with the present invention, with a portion of the spindle structure broken away to reveal the centrifugally operated parts;

FIG. 2 is a sectional view taken along the line 2—2 of FIG. 1;

FIG. 3 is a sectional view taken along the line 3—3 of FIG. 2.

Turning now to the drawing in greater detail, the chuck provided according to this invention is indicated generally at 10, with a tool element, such as a conventional twist drill, being shown in phantom lines at 12. The chuck 10 comprises a part of a spindle structure 16 which is rotatable about its longitudinal axis by conventional means (not shown). The twist drill 12 is of conventional configuration having cutting surfaces defined along a portion of its length, and having a shank portion 14 which is held in the spindle structure with the novel centrifugally operated parts to be described hereinbelow.

The spindle structure 16 comprises a reduced diameter end portion 18 having a cylindrical sleeve 20 press fitted thereon. The reduced diameter portion 18 has a precisely centered axially extending bore 22 which is cylindrical or otherwise shaped to receive the shank portion 14 of the tool element or twist drill 12 in a smooth sliding fit which will not permit off center run out of the tool.

In accordance with the present invention, the end portion 18 of the spindle further defines at least one generally radially extending or transverse cavity 24, and preferably defines a pair of radially opposed cavities as shown at 24, 24, each of which communicates with and extends across the axially extending bore 22, the said cavities being spaced apart along the said bore. As shown in FIG. 1, inner radial end portions of each of the radially opposed cavities 24, 24 extends across the bore 22, and as shown, said cavities 24, 24 are generally cylindrical in shape with the last-mentioned end portions being of reduced diameter.

In further accord with the present invention, generally cylindrically shaped plugs 26, 26 are slidably disposed in the radially extending cavities 24, 24, respectively. The inner end portion 36 of each plug is of reduced diameter to fit the reduced diameter portion of its associated cavity 24, and the outer portion 38 of each plug fits the large diameter portion of the cavity. As thus shaped, a radially inwardly facing annular flange or shoulder 34 is defined on each plug 26, and a flat annular spring 30 is provided between the flange 34 and the radially outwardly facing shoulder separating the stepped cylindrical inner and outer portions of its associated cavity 24 so as to urge each plug 26 toward the position indicated generally in FIG. 2.

The plugs 26, 26 constitute the gripper elements or jaws of the chuck which are influenced by centrifugal force to engage and retain the tool 12 by gripping its shank 14. Each plug or jaw 26 is adapted to engage the tool shank by having a transverse opening 28 extending through its reduced diameter portion 36. Like the spindle bore 22, the jaw opening 28 is cylindrical or otherwise shaped to receive the tool shank 14, and it will be seen that such opening in each jaw is located on the jaw so that it can be aligned with the spindle bore. It will also be seen that the jaw openings 28, 28 are substantially the same diameter as the spindle bore 22, but they may be slightly larger than the bore to facilitate entry and removal of the tool shank with the spindle at rest.

When the spindle is at rest, the openings 28, 28 in the plugs 26, 26 are offset slightly with respect to the spindle bore 22, this being caused by the force of springs 30, 30 on the plugs. Upon insertion of the chamfered end of the shank portion 14 of a twist drill or the like in the bore, each plug is cammed radially inwardly against the force provided by associated annular spring 30. With the tool shank inserted, the springs 30, 30 exert a force on the jaws or plugs 26, 26 causing them to grip the shank with sufficient force to hold the tool in place with the spindle at rest. This spring biased gripping force permits insertion and removal of tools, merely by sliding them in and out.

It is quite obvious that when the spindle is rotated, centrifugal force acting upon the eccentrically disposed greater mass portions 38, 38 of the plugs or jaws 26, 26 will cause them to move radially outwardly in their spindle cavities 24, 24. This causes the said jaws to exert oppositely directed transverse binding forces on the tool shank 14 within the spindle bore 22, thus preventing relative rotation between the tool and spindle. It is also obvious that the binding or gripping force increases with spindle speed, but if the gripping force is exceeded by the tool becoming jammed in work, the tool shank can slip in the jaw openings and tool damage may thereby be avoided.

Suitable means is provided for restricting movement of the plugs 26, 26 to radial movement perpendicular to the axis of the bore 22 in order to maintain the openings 28, 28 in each of said plugs in alignment with said bore. Preferably, and as best shown in FIG. 3, said means comprises a key 32 disposed in suitable complementary key ways provided in the larger diameter portions of each plug or jaw 26 and its associated cavity 24.

It will be readily understood that in the manufacture of the spindle and chuck, the sleeve 20 is press fitted over the reduced diameter end portion 18 of the spindle after machining thereof and after assembly of the plug jaws 26, 26. It will also be understood that the sleeve is provided to prevent the said jaws from flying out of the chuck in the event the spindle is rotated without a tool in place. However, the jaw cavities 24, 24 are provided in sufficient depth to prevent the jaws from engaging the sleeve with a tool in place so that their centrifugal gripping force on the tool shank cannot be diminished by such engagement.

The invention claimed is:

1. A device for holding a tool and comprising a spindle having an axial bore shaped to receive said tool, said spindle having a plurality of axially spaced cavities communicating with said bore and having portions disposed on either side of said bore and arranged generally radially with respect to said bore axis, a plug slidably received in each of said cavities for engaging spaced areas of said tool to frictionally clamp the tool when the spindle is rotated, each of said plugs having an opening for receiving said tool shank portion when said opening is axially aligned with said bore and being urged radially outwardly under centrifugal force during such spindle rotation.

2. The device of claim 1 and further characterized by biasing means for urging each of said plugs radially outwardly, whereby said tool can be frictionally held in said bore when said spindle is not rotating.

3. The device of claim 2 wherein said plugs are of cylindrical contour, and wherein said device further includes means for restricting each of said plugs to radial movement only relative to the bore.

4. The device of claim 2 and further characterized by a sleeve fitted over said spindle to hold said plugs in assembled relation inside their respective cavities.

5. The device of claim 2 wherein two such cavities and plugs are provided in radially opposed relation on opposite sides of said bore, each of said plugs is of cylindrical contour having an inner end portion which defines said opening and an outer portion of larger diameter than said inner portion wherein the cavities are shaped to complement the plugs whereby opposed annular shoulders are defined between each plug and associated cavity, and wherein said biasing means comprises an annular spring acting between said shoulders to urge the associated plug radially outwardly in order to frictionally hold said tool in said bore when said spindle is not rotating.

6. The device of claim 5 further characterized by means for restricting each of said plugs to radial movement only relative to the bore.

7. The device of claim 6 wherein said means for restricting movement of each of said plugs comprises a key associated with each of said plugs, each of said keys being received in part in the associated cavity.

References Cited

UNITED STATES PATENTS 885,392  4/1908  Spets _____ 279—76

FOREIGN PATENTS 1,103,112  5/1955  France.

ROBERT C. RIORDON, Primary Examiner

U.S. Cl. X.R.

192—105